Patented Apr. 20, 1954

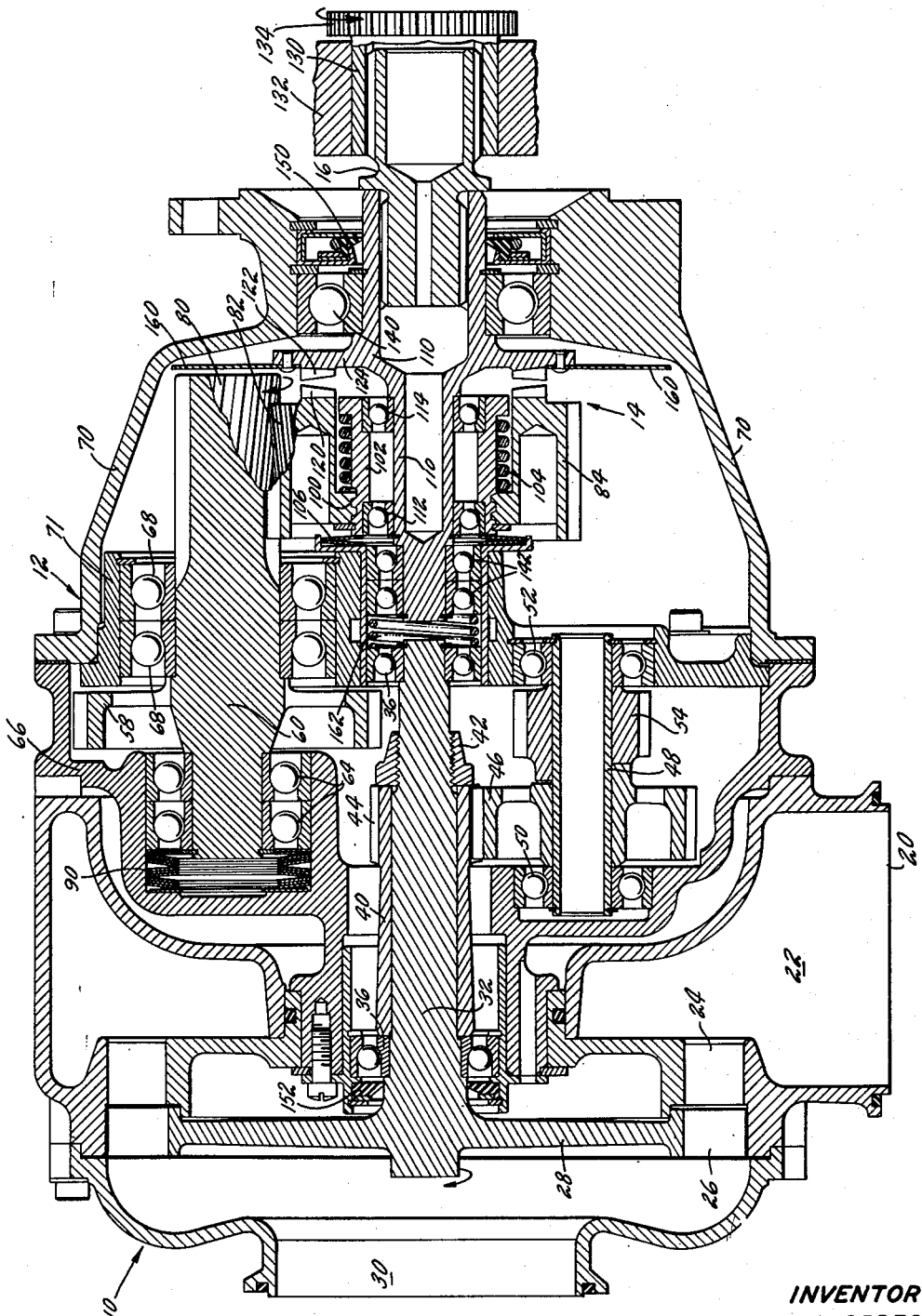

2,675,708

UNITED STATES PATENT OFFICE 2,675,708

STARTER GEARING

Einar M. Orbeck, West Hartford, Conn., assignor to United Aircraft Corporation, East Hartford, Conn., a corporation of Delaware Application July 5, 1952, Serial No. 297,228

6 Claims. (Cl. 74—7)

This invention relates to starters and more specifically to pneumatic starters for high speed power plants.

It is an object of this invention to provide a turbine-driven starter for power plants requiring high starting speeds.

It is another object of this invention to provide a starter of the type described including a clutching mechanism contained within the starter housing. These and other objects of this invention will become readily apparent from the following detail description of the drawing which illustrates a cross-sectional view of the starter of this invention with portions of the cross section being taken in several different planes so as to fully show the parts.

Referring to the drawing, the starter comprises a power section generally indicated at 10, a reduction unit 12, a clutch unit 14 and a member 16 for driving the power plant. The power unit 10 comprises an intake opening 20 which leads to an annular chamber 22 and into which pressurized gases are admitted. The gases may be compressed air, high temperature combustion products or gases from any form of gas generator. The fluid from chamber 22 passes through a plurality of nozzles 24 from where it is directed against the blades 26 of a turbine rotor 28. After leaving the turbine the gases may escape via the central opening 30. The turbine rotor 28 forms an integral part of a shaft 32 which is mounted centrally of the starter by means of a ball bearing unit 36.

A sleeve 40 surrounds the shaft 32 and is fixed relative thereto by means of a nut 42. The sleeve 40 includes integral teeth 44 which engage the teeth of two gears, one of which is indicated at 46. Another gear such as 46 engages the teeth 44 at a diametrically opposite point. The other gear is not illustrated herein since the drawing shows a cross section which is taken in several planes. The gear 46 and its companion gear 54 are mounted on a shaft 48 which in turn is rotatably mounted in ball bearings 50 and 52. Again, as mentioned in connection with the gear 46, there are two diametrically opposite shafts 48 which are identical but only one of the shafts is shown. The gear 54 engages one of two gears such as 58 each of which is carried by a separate countershaft 60. Again, as mentioned previously, there are two shafts such as 60 diametrically opposite each other but only one is shown. The shaft 60 is mounted at one end in a double set of ball bearings 64 which are carried by the casing portion 66. The shaft 60 is also supported intermediate its ends by another set of double ball bearings 68 which are carried within the casing portion 70 by housing 71.

The right-hand end of the shaft 60 carries integral helical gear teeth 80 which are adapted to engage cooperating helical teeth 82 carried by the gear 84. The shafts such as 60 at their left-hand end are engaged by a stack of Belleville springs 90. These springs act to permit axial movement of the shaft 60 so as to permit equalization of the loads between the two gear trains, bearings 68 and the adjacent case 70, and the bearings 64 relative to the adjacent casing 66.

The gear 84 has an internal high pitch thread 100 which mates with a corresponding thread carried by a sleeve 102. The gear 84 and the sleeve 102 are urged in the position shown by means of a spring 104. A Belleville spring or washer 106 engages the left-hand end of the sleeve 102 and acts as a friction member which tends to restrain the sleeve 102 against rotation since the sleeve 102 is mounted on shaft 110 by means of a set of ball bearings 112 and 114.

When pressurized gases cause rotation of the turbine rotor 28 which by means of the gear train described previously rotates the shaft 60 which in turn tends to rotate gear 84, the sleeve 102 will tend to be restrained by the friction of the Belleville washer 106 so as to cause the gear 84 by reason of the high lead thread 100 to advance toward the right against the pressure of spring 104 so that its clutch teeth 120 will begin to engage with the clutch teeth 122 which are carried by annular flange 124 formed integral with the shaft 110. When the clutch teeth 120 and 122 first engage, the load when transmitted back to the helical teeth 80 and 82 will cause more positive engaging force to be applied to the clutch teeth 120. In other words, the relative angles of the helical teeth 80 and 82 are such that under load the gear 84 will tend to move to the right.

Upon engagement of the teeth 120 and 122 the shaft 110 will be caused to rotate so as to drive the element 16 which in turn is in continuous engagement with a member 130 carried by a fixed portion 132 of the power plant proper. The element 130 is rotatable within the fixed portion 132 and carries a gear 134 adapted to engage the driving shaft of the power plant.

The shaft 110 is mounted within a starter casing 70 by means of a ball bearing 140 adjacent the right-hand end of the shaft and a double set of ball bearings 142. Thus it can be seen that the shaft 110 will rotate continuously during operation of the power plant while the clutch teeth 120 and 122 will be engaged and disengaged upon control of the fluid which tends to rotate the turbine 28. In other words, as the power plant gets up to speed the fluid supplied to the inlet 20 will be cut off and the various gears of the starter will decelerate so that eventually the spring 104 will return the gear 84 to the disengaged position illustrated. Seals such as 150 adjacent the right-hand side of the casing and 152 adjacent the turbine end of the casing insure that the area internally of the entire starter casing is fluid tight. A filler opening (not illustrated) is provided so that a certain level of lubricating oil can be maintained within the starter housing. Under these conditions the gears 46 and 58 dip into the oil so that a mist lubrication is provided. When the main power plant is operating and the starter gears are stationary, a splasher plate 160 carried by the annular flange 124 of the shaft 110 provides adequate lubrication. In other words, since the shaft 110 is rotating during the operation of the power plant the disc 160 will dip into the oil and distribute sufficient lubrication which will be particularly needed for the bearings 140 and 142 which support the shaft 110 and also bearings 112 and 114. In order to preload the bearings which support the turbine shaft 32 and the shaft 110 a spring 162 is provided at the adjacent ends of these shafts forcing them in opposite directions.

As a result of this invention it is apparent that a compact and rugged starter has been provided which can transmit high power through its gear reduction mechanism while doing so under load equalized conditions. Hence, it is apparent that manufacturing tolerances and the like will not have a deleterious effect on wearing qualities of the several parts. Furthermore, the clutching and engaging elements of the starter are completely housed within its casing so that the starter can be mounted on and engaged to the power plant by a simple standard splined connection.

It should also be noted that with the type of gear train described, initial load difference between each train may be in the order of a 40-60 ratio. Therefore, since the helical splines at the end of shaft 60 causes the pressure on Belleville spring 90 to be directly related to the torque carried by the shaft the shaft carrying the heavier load will tend to wear more rapidly. As a result, the loads will tend to equalize as wear progresses.

Although only one embodiment of this invention has been illustrated and described herein it will be apparent that various changes and modifications can be made in the construction and arrangement of the various parts without departing from the scope of this novel concept.

What it is desired to obtain by Letters Patent is:

1. In a starter for a rotary member, a rotary driving element, a member driven by said element and adapted to be moved along its axis for engagement with the rotary member, cooperating mechanism for drivably connecting said members upon engagement thereof, a sleeve coaxially disposed within said driven member including spiral teeth engaging cooperating teeth on an internal surface of said driven member, and means for restraining said sleeve against rotation to cause relative axial movement of said driven member.

2. In a starter for a rotary member, a rotary driving element, a member driven by said element and adapted to be moved along its axis for engagement with the rotary member, cooperating mechanism for drivably connecting said members upon engagement thereof, said driven member including an internal surface having teeth carried thereby, a sleeve coaxially disposed within said driven member including spiral teeth cooperatively engaging the teeth on the internal surface of said driven member, resilient means urging said driven member in one axial direction relative to said sleeve, and means for restraining said sleeve against rotation to cause relative axial movement of said driven member in another axial direction for engagement with said rotary member including friction means having continuous engagement with said sleeve.

3. In a starter for an internal combustion power plant having an element to be driven by the starter, a power device for energizing the starter including a rotatable member having helical teeth, a second member having helical teeth and engaging said first member for rotation therewith, a shaft including a third member to be engaged and driven by said second member, cooperating mechanism drivably connecting said second and third members upon engagement thereof, means for engaging said second and third members upon energization of the starter, said helical teeth urging further engagement of said second and third members upon initial engagement thereof due to loads imposed thereupon, a housing enclosing said members including a journal for said shaft, and means externally of said housing and carried by said shaft having a continuous engagement with said element.

4. In a starter according to claim 3 wherein said means for engaging comprises a sleeve fixed against axial movement having a thread engaging said second member, and friction means for restraining rotation of said sleeve to induce axial motion of said second member.

5. In a clutch device for a starter having a rotatable driving member, said driving member being hollow and having internal threads, means for rotating said driving member, a shaft having one end engageable with an element to be rotated, a dog member fixed intermediate the ends of said shaft adapted to be engaged by said driving member, a sleeve freely mounted on the other end of said shaft, external threads on said sleeve engaging said internal threads, means carried by said driving member for engaging said dog member, said driving member being adapted to advance along the axis of said shaft relative to said sleeve and engage said dog, resilient means urging said driving member toward disengaged position, and friction means engaging said sleeve to hinder rotation thereof whereby said driving member advances relative to said sleeve to engage said dog upon rotation thereof so as to rotate said shaft.

6. In a starter for an internal combustion power plant having an element to be driven by the starter, a power device for energizing the starter, a toothed member operatively connected to and driven by said device, a shaft including a member to be engaged by said toothed member, cooperating mechanism for drivably connecting said members upon engagement thereof, means for engaging said members upon energization of the starter, a housing enclosing said members including a journal for said shaft, and means externally of said housing and carried by said shaft having a continuous engagement with said element.

References Cited in the file of this patent

UNITED STATES PATENTS

| Number | Name | Date |
| --- | --- | --- |
| 2,258,160 | Nardone | Oct. 7, 1941 |
| 2,453,215 | Gilbert | Nov. 9, 1948 |